United States Patent
Niepokólczycki et al.

(10) Patent No.: US 9,183,180 B2
(45) Date of Patent: Nov. 10, 2015

(54) METHOD FOR IN-FLIGHT ASSESSMENT OF FREEDOM FROM FLUTTER OF AN AIRPLANE

(71) Applicant: Instytut Lotnictwa w Warszawie, Warsaw (PL)

(72) Inventors: Antoni Niepokólczycki, Warsaw (PL); Franciszek Lenort, Warsaw (PL); Robert Królikowski, Warsaw (PL); Michal Szmidt, Warsaw (PL); Pawel Kucio, Warsaw (PL)

(73) Assignee: INSTYTUT LOTNICTWA W. WARSZAWIE, Warsaw (PL)

( * ) Notice: Subject to any disclaimer, the term of this patent is extended or adjusted under 35 U.S.C. 154(b) by 612 days.

(21) Appl. No.: 13/716,150

(22) Filed: Dec. 16, 2012

(65) Prior Publication Data

US 2013/0158891 A1 Jun. 20, 2013

(30) Foreign Application Priority Data

Dec. 16, 2011 (EP) ..................................... 11461543

(51) Int. Cl.
*G01M 7/00* (2006.01)
*G06F 17/10* (2006.01)
*G01H 1/00* (2006.01)
*G06F 17/14* (2006.01)
*B64D 45/00* (2006.01)

(52) U.S. Cl.
CPC .................. *G06F 17/10* (2013.01); *G01H 1/00* (2013.01); *G01M 7/00* (2013.01); *G06F 17/142* (2013.01); *B64D 2045/0085* (2013.01)

(58) Field of Classification Search
CPC ......... G01H 1/00; G06F 17/142; G06F 17/10; G01M 7/00; B64D 2045/0085
See application file for complete search history.

(56) References Cited

U.S. PATENT DOCUMENTS 6,195,982 B1 * 3/2001 Gysling et al. .................. 60/204
6,216,063 B1 4/2001 Lind

FOREIGN PATENT DOCUMENTS

KR 20080000713 1/2008

OTHER PUBLICATIONS

Paek Seung Kil et al., Esp@ce.net Machine Translation of KR20080000713, Jan. 3, 2008, pp. 1-4.*
Crawley, E.F., A Modern Course in Aeroelasticity, Chapter 5 Stall flutter, 1995, Springer Science+Business Media Dordrecht, pp. 275-297.*
R.M. Bennet et al, "Application of a flight test data analysis technique to flutter of a drone aircraft", Nasa Technical Memorandum 83136, May 1, 1981, pp. 1-10.

* cited by examiner

*Primary Examiner* — Mischita Henson
(74) *Attorney, Agent, or Firm* — Mark M. Friedman

(57) ABSTRACT

A computer-implemented method for in-flight assessment of freedom from flutter of an airplane, involving analyzing the airplane structure vibrations based on signals indicated by sensors located on the airplane structure. The computations are performed in real-time based on current measurement data collected from the sensors. For measurement data from individual sensors there are determined mode shapes of vibrations. The relevancy of modes of vibrations is determined by subtracting from the vibrations signal the particular mode of vibrations and calculating the value of decrease in the rest sum of squares.

6 Claims, 21 Drawing Sheets

Figures 1, 2:
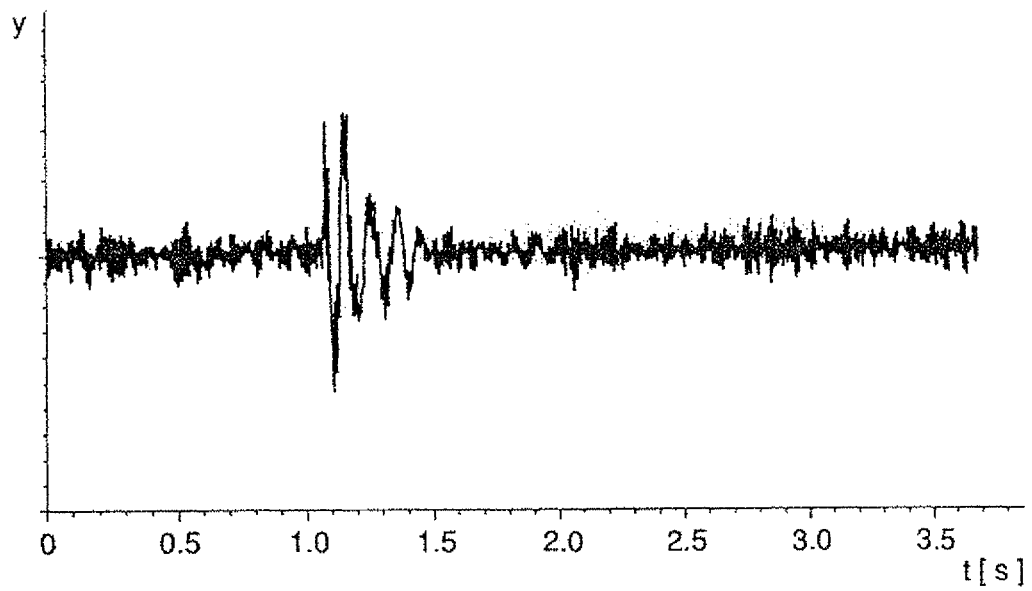

$$R_{yy}(\tau) \approx \hat{R}_{yy}(\tau) = \frac{1}{T-\tau}\int_0^{T-\tau}[y(t)-m_y][y(t+\tau)-m_y]dt \quad (1)$$

where $\quad m_y \approx \hat{m}_y = \frac{1}{T}\int_0^T y(t)dt$ $$\hat{y}(t) = \sum_{p=1}^{P} A_p \exp(-\lambda_p t) \sin(\omega_{wp} t + \varphi_p)$$

$$\hat{y}(t) = \sum_{p=1}^{P} \exp(-\lambda_p t)[a_p \cos(\omega_{wp} t) + b_p \sin(\omega_{wp} t)]$$

$$\lambda_p = \zeta_p \omega_{0p} = \frac{\zeta_p}{\sqrt{1-\zeta_p^2}} \omega_{wp}$$

$$\omega_{wp} = \omega_{0p} \sqrt{1-\zeta_p^2}$$

wherein

- $\zeta_p$ — Dimensionless damping coefficient
- $\omega_{0p}$ — Frequency in rad/s of natural vibrations of the setup without damping
- $\omega_{wp}$ — Frequency of natural vibrations with damping, frequency of freely decaying vibrations of the setup with damping For a setup having one degree of freedom, described with a formula:

$$m\ddot{y} + c\dot{y} + ky = 0$$

There are known relations $$\omega_0 = \sqrt{\frac{k}{m}}$$

$$\zeta = \frac{c}{c_{kr}} = \frac{c}{2\sqrt{km}}$$

The formula may be put down in a form of:

$$\ddot{y} + 2\zeta \omega_0 \dot{y} + \omega_0^2 y = 0$$

Fig. 3

$$RSS = \sum_{n=0}^{N-1} [y(t_n) - \hat{y}(t_n)]^2$$

$$a_{pi} = a_p \exp(-\lambda_p t)$$

$$b_{pi} = b_p \exp(-\lambda_p t)$$

$$\lambda_p = \frac{\zeta_p}{\sqrt{1-\zeta_p^2}} 2\pi f_{wp}$$

$$\frac{\partial RSS}{\partial a_{pi}} = -2\sum_{n=0}^{N-1} [y(t_n) - \sum_{p=1}^{P}(a_{pi}\cos\omega_{wp}t_n + b_{pi}\sin\omega_{wp}t_n)]\cos\omega_{wi}t_n = 0$$

$$\frac{\partial RSS}{\partial b_{pi}} = -2\sum_{n=0}^{N-1} [y(t_n) - \sum_{p=1}^{P}(a_{pi}\cos\omega_{wp}t_n + b_{pi}\sin\omega_{wp}t_n)]\sin\omega_{wi}t_n = 0$$

for $i = 1,2,3,...,P$.

By changing the order of summing, we obtain:

$$\sum_{p=1}^{P}\sum_{n=0}^{N-1} \hat{y}_{pn}\cos\omega_{wi}t_n = \sum_{n=0}^{N-1} y_n \cos\omega_{wi}t_n \qquad i=1,2,...,P \qquad (2)$$

$$\sum_{p=1}^{P}\sum_{n=0}^{N-1} \hat{y}_{pn}\sin\omega_{wi}t_n = \sum_{n=0}^{N-1} y_n \sin\omega_{wi}t_n \qquad i=1,2,...,P \qquad (3)$$

For conciseness of the formula the following have been defined $$\hat{y}_{pn} = a_{pi}\cos\omega_{wp}t_n + b_{pi}\sin\omega_{wp}t_n$$

$$y_n = y(t_n)$$

Fig. 4

$$\sum_{n=0}^{N-1} y_n \cos \omega_{wp} t_n \quad (4)$$

$$\sum_{n=0}^{N-1} y_n \sin \omega_{wp} t_n \quad (5)$$

$$\begin{aligned}
Re\hat{Y}_{w1,1} + Re\hat{Y}_{w1,2} + \cdots + Re\hat{Y}_{w1,P} &= ReY_{w1} \\
Re\hat{Y}_{w2,1} + Re\hat{Y}_{w2,2} + \cdots + Re\hat{Y}_{w2,P} &= ReY_{w2} \\
\vdots \quad \vdots \quad \vdots \quad \vdots & \\
Re\hat{Y}_{wP,1} + Re\hat{Y}_{wP,2} + \cdots + Re\hat{Y}_{wP,P} &= ReY_{wP}
\end{aligned} \quad (6)$$

$$\begin{aligned}
Im\hat{Y}_{w1,1} + Im\hat{Y}_{w1,2} + \cdots + Im\hat{Y}_{w1,P} &= ImY_{w1} \\
Im\hat{Y}_{w2,1} + Im\hat{Y}_{w2,2} + \cdots + Im\hat{Y}_{w2,P} &= ImY_{w2} \\
\vdots \quad \vdots \quad \vdots \quad \vdots & \\
Im\hat{Y}_{wP,1} + Im\hat{Y}_{wP,2} + \cdots + Im\hat{Y}_{wP,P} &= ImY_{wP}
\end{aligned} \quad (7)$$

wherein $\hat{Y}_{wx,i}$ — A transform for the sought i-th component for frequency $\omega_{wp}$ $Y_{wx}$ — A transform of the signal at point $\omega_{wp}$ $$\begin{aligned}
\hat{Y}_{w1,1} + \hat{Y}_{w1,2} + \cdots + \hat{Y}_{w1,P} &= Y_{w1} \\
\hat{Y}_{w2,1} + \hat{Y}_{w2,2} + \cdots + \hat{Y}_{w2,P} &= Y_{w2} \\
\vdots \quad \vdots \quad \vdots \quad \vdots & \\
\hat{Y}_{wP,1} + \hat{Y}_{wP,2} + \cdots + \hat{Y}_{wP,P} &= Y_{wP}
\end{aligned} \quad (8)$$

In a vector form:

$$\left\{ \sum_{i=1}^{P} \hat{Y}_{wp,i} \right\} = \{Y_{wp}\} \qquad p = 1,2,\ldots,P \quad (9)$$

Fig. 5

$$\hat{Y}_{11} + \hat{Y}_{12} = Y_1$$
$$\hat{Y}_{21} + \hat{Y}_{22} = Y_2$$

For typical signals, the following relations hold:

$$|\hat{Y}_{11}| \gg |\hat{Y}_{12}| \quad i \quad |\hat{Y}_{22}| \gg |\hat{Y}_{21}|$$

$$\begin{aligned}\hat{Y}_{w1,1} &= Y_{w1} \\ \hat{Y}_{w2,1} &= Y_{w2} \\ &\vdots \quad \vdots \\ \hat{Y}_{wP,1} &= Y_{wP}\end{aligned} \qquad (10)$$

$$y(t) = \cos(\omega_w t + \varphi)$$

$$Y(\omega_w) = \int_0^T \cos(\omega_w t + \varphi) \exp(-j\omega_w t)\,dt$$

Therefore $$Re\,Y(\omega_w) = \int_0^T (\cos\omega_w t \cos\varphi - \sin\omega_w t \sin\varphi)\cos\omega_w t\,dt$$

$$Im\,Y(\omega_w) = -\int_0^T (\cos\omega_w t \cos\varphi - \sin\omega_w t \sin\varphi)\sin\omega_w t\,dt$$

For $\quad T = l \cdot T_{okr} = l \cdot \dfrac{2\pi}{\omega_w} \quad$ There is $$Re\,Y(\omega_w) = \frac{T}{2}\cos\varphi$$

$$Im\,Y(\omega_w) = \frac{T}{2}\sin\varphi$$

Therefore $$\varphi = arctg\,\frac{Im\,Y(\omega_w)}{Re\,Y(\omega_w)}$$

Similarly, for a function:

$$y(t) = \sin(\omega_w t + \varphi)$$

There is obtained a relation:

$$\varphi = arctg\,\frac{Re\,Y(\omega_w)}{-Im\,Y(\omega_w)}$$

Fig. 9

$$y(t) = \exp(-\lambda t)\sin(\varpi t + \varphi)$$

Fig. 10

By executing a Fourier transform at point $f_w$ for a function:

$$y(t) = A\exp(-\lambda T)\sin(\omega_w t + \varphi)$$

There is obtained a relation $$A = \frac{|Y(\omega_w)|}{|F[\exp(-\lambda t)\sin(\omega_w t + \varphi)]_{\omega_w}|}$$

$$R_{yy}(l) = \frac{1}{N/2}\sum_{n=1}^{N/2} y_n \cdot y_{n+l} \qquad (12)$$

$n = 1,2,3,...,N \qquad l = 0,1,2,...,N/2$ $$R_{yy}(\tau) = \frac{1}{T}\int_{t=0}^{T} y(t) \cdot y(t+\tau) \cdot dt \qquad (13)$$

$y(t)$ is a real signal in the range $\quad 0 \leq t \leq T+\tau$ $0 \leq \tau < T$ $$y(t) = A\exp(-\zeta\omega_0 t)\sin(\omega_d t) \qquad (14)$$

wherein  $A$ — Vibrations amplitude $\zeta$ — Viscous damping coefficient $\omega_0$ — Frequency of natural vibrations, of the setup, without damping $\omega_d$ — Frequency of natural vibrations, of the setup, with damping   $\omega_d = \omega_0\sqrt{1-\zeta^2}$

Fig. 17

$$R_{y,T}(\tau) = \frac{1}{T}\int_{t=0}^{T} y(t)\cdot y(t+\tau)\cdot dt =$$

$$= \frac{1}{T}\int_{t=0}^{T} A\exp(-\zeta\omega_0 t)\sin(\omega_d t)\cdot A\exp(-\zeta\omega_0(t+\tau))\sin(\omega_d(t+\tau))dt =$$

$$= \frac{A^2}{T}\exp(-\zeta\omega_0\tau)\int_{t=0}^{T}\exp(-2\zeta\omega_0 t)[\sin^2(\omega_d t)\cos(\omega_d\tau) + \sin(\omega_d t)\cos(\omega_d t)\sin(\omega_d\tau)]dt =$$

$$= \frac{A^2}{T}\exp(-\zeta\omega_0\tau)\cos(\omega_d\tau)\int_{t=0}^{T}\exp(-2\zeta\omega_0 t)\sin^2(\omega_d t)dt +$$

$$+ \frac{A^2}{T}\exp(-\zeta\omega_0\tau)\sin(\omega_d\tau)\int_{t=0}^{T}\exp(-2\zeta\omega_0 t)\sin(\omega_d t)\cos(\omega_d t)dt =$$

$$= C_1\exp(-\zeta\omega_0\tau)\cos(\omega_d\tau) + C_2\exp(-\zeta\omega_0\tau)\sin(\omega_d\tau)$$

wherein $$C_1 = \frac{A^2}{T}\int_{t=0}^{T}\exp(-2\zeta\omega_0 t)\sin^2(\omega_d t)dt =$$

$$= \frac{A^2}{T}\int_{t=0}^{T}\exp(-2\zeta\omega_0 t)\frac{1}{2}(1-\cos(2\omega_d t))dt =$$

$$= \frac{A^2}{2T}\int_{t=0}^{T}\exp(-2\zeta\omega_0 t)dt - \frac{A^2}{2T}\int_{t=0}^{T}\exp(-2\zeta\omega_0 t)\cos(2\omega_d t)dt =$$

$$= C_{11} - C_{12}$$

Fig. 18

$$C_{11} = \frac{A^2}{2T} \int_{t=0}^{T} exp(-2\zeta\omega_0 t)dt =$$

$$= A^2 \frac{1 - exp(-2\zeta\omega_0 T)}{4\zeta\omega_0 T}$$

for $T = kT_{obr} = k\, 2\pi/2\omega_d$, $k = 1,2,3,...$ an integral $$C_{12} = \frac{A^2}{2T} \int_{t=0}^{T} exp(-2\zeta\omega_0 t) cos(2\omega_d t)dt =$$

$$= A^2 \frac{\zeta\omega_0 [1 - exp(-2\zeta\omega_0 T)]}{4T[\omega_d^2 + (\zeta\omega_0)^2]}$$

for $T = kT_{obr} = k\, 2\pi/2\omega_d$, $k = 1,2,3,...$ an integral $$C_3 = \frac{A^2}{T} \int_{t=0}^{T} exp(-2\zeta\omega_0 t) sin(\omega_d t) cos(\omega_d t)dt =$$

$$= \frac{A^2}{2T} \int_{t=0}^{T} exp(-2\zeta\omega_0 t) sin(2\omega_d t)dt =$$

$$= A^2 \frac{\omega_d (1 - exp(-2\zeta\omega_0 T))}{4T[\omega_d^2 + (\zeta\omega_0)^2]}$$

Fig. 19

$$R_{yy,T}(\tau) = (C_{11} - C_{12}) exp(-\zeta\omega_0 \tau) cos(\omega_d \tau) + C_3 exp(-\zeta\omega_0 \tau) sin(\omega_d \tau) =$$

$$= \{A^2 \frac{1 - exp(-2\zeta\omega_0 t)}{4\zeta\omega_0 T} - A^2 \frac{\zeta\omega_0 [1 - exp(-2\zeta\omega_0 T)]}{4T[\omega_d^2 + (\zeta\omega_0)^2]}\} exp(-\zeta\omega_0 \tau) cos(\omega_d \tau) +$$

$$+ A^2 \frac{\omega_d [1 - exp(-2\zeta\omega_0 T)]}{4T[\omega_d^2 + (\zeta\omega_0)^2]} exp(-\zeta\omega_0 \tau) sin(\omega_d \tau) =$$

$$= A^2 \frac{1 - exp(-2\zeta\omega_0 T)}{4\zeta\omega_0 T[\omega_d^2 + (\zeta\omega_0)^2]} exp(-\zeta\omega_0 \tau) [\omega_d^2 cos(\omega_d \tau) + \omega_d \zeta\omega_0 sin(\omega_d \tau)] =$$

$$= A^2 \frac{\omega_d [1 - exp(-2\zeta\omega_0 T)]}{4\zeta\omega_0 T \sqrt{\omega_d^2 + (\zeta\omega_0)^2}} exp(-\zeta\omega_0 \tau) sin(\omega_d \tau + \varphi) =$$

$$= A^2 \sqrt{1 - \zeta^2} \frac{[1 - exp(-2\zeta\omega_0 T)]}{4\zeta\omega_0 T} exp(-\zeta\omega_0 \tau) sin(\omega_d \tau + \varphi)$$

Fig. 20

$$R_{yy,T}(\tau) = C \exp(-\zeta\omega_0\tau) \sin(\omega_d\tau + \varphi) \qquad (15)$$

Wherein the constant C is formulated as $$C = A^2 \sqrt{1-\zeta^2} \frac{[1 - \exp(-2\zeta\omega_0 T)]}{4\zeta\omega_0 T}$$

$$\sin\varphi = \frac{\omega_d}{\sqrt{\omega_d^2 + (\zeta\omega_0)^2}} \qquad \cos\varphi = \frac{\zeta\omega_0}{\sqrt{\omega_d^2 + (\zeta\omega_0)^2}}$$

$$\varphi = \operatorname{arctg}\frac{\omega_d}{\zeta\omega_0} = \operatorname{arctg}\frac{\omega_0\sqrt{1-\zeta^2}}{\zeta\omega_0} = \operatorname{arctg}\frac{\sqrt{1-\zeta^2}}{\zeta}$$

It follows from the above equation that:

$$tg\varphi = \frac{\omega_d}{\zeta\omega_0} = \frac{\sqrt{1-\zeta^2}}{\zeta} = \frac{\sin\varphi}{\cos\varphi} = \frac{\sqrt{1-\cos^2\varphi}}{\cos\varphi}$$

therefore $\qquad\qquad \varphi = \arccos\zeta \qquad (16)$

Fig. 21

$$R_{yy,\infty}(\tau) = \lim_{T \to +\infty} \int_{t=0}^{T} y(t) \cdot y(t+\tau) \cdot dt \qquad (17)$$

Fig. 22

$$R_{yy,\infty}(\tau) = A^2 \sqrt{1-\zeta^2} \lim_{T \to +\infty} \frac{[1-\exp(-2\zeta\omega_0 T)]}{4\zeta\omega_0} \exp(-\zeta\omega_0 \tau) \sin(\omega_d \tau + \varphi)$$

therefore $$R_{yy,\infty}(\tau) = A^2 \sqrt{1-\zeta^2} \frac{1}{4\zeta\omega_0} \exp(-\zeta\omega_0 \tau) \sin(\omega_d \tau + \varphi)$$

thus $$R_{yy,\infty}(\tau) = C_{\infty} \exp(-\zeta\omega_0 \tau) \sin(\omega_d \tau + \varphi)$$

wherein $C_{\infty} = const$

Fig. 23

$$R_{yy,T-\tau}(\tau) = \frac{1}{T-\tau} \int_{t=0}^{T-\tau} y(t) \cdot y(t+\tau) \cdot dt \qquad (18)$$

Fig. 24

$$R_{yy,T-\tau}(\tau) = A^2 \sqrt{1-\zeta^2} \frac{[1-\exp(-2\zeta\omega_0(T-\tau))]}{4\zeta\omega_0(T-\tau)} \exp(-\zeta\omega_0 \tau) \sin(\omega_d \tau + \varphi)$$

Wherein the formula $$C_{T-\tau}(T-\tau) = A^2 \sqrt{1-\zeta^2} \frac{[1-\exp(-2\zeta\omega_0(T-\tau))]}{4\zeta\omega_0(T-\tau)}$$

is not a constant and depends on shift time $\tau$.

Fig. 25

Wherein $t$ is the shift time $\tau$, $C = C_{T\text{-}\tau}(T\text{-}\tau)$ $A = 1, \quad \zeta = 0.015, \quad f_0 = 10.6\ Hz.$ $$\lambda = \zeta \omega_0 \quad \text{and} \quad \omega = \omega_d$$

$$C_{11} = A^2 \frac{1 - \exp(-2\lambda T)}{4\lambda T}$$

$$C_{12} = \frac{A^2}{4T\sqrt{\lambda^2 + \omega^2}} [\cos \varphi - \exp(-2\lambda T) \cos(\omega T + \varphi)]$$

Wherein $\varphi = arctg \frac{\omega}{\lambda}$ $$C_2 = \frac{A^2}{4T\sqrt{\lambda^2 + \omega^2}} [\sin \varphi - \exp(-2\lambda T) \sin(\omega T + \varphi)]$$

Fig. 28

$$R_{yy,T}(\tau) = C_1 \exp(-\lambda \tau) \cos(\omega \tau) + C_2 \exp(-\lambda \tau) \sin(\omega \tau) =$$
$$= (C_{11} - C_{12}) \exp(-\lambda \tau) \cos(\omega \tau) + C_2 \exp(-\lambda \tau) \sin(\omega \tau) =$$
$$= \exp(-\lambda \tau)[(C_{11} - C_{12}) \cos(\omega \tau) + C_2 \sin(\omega \tau)]$$

$$a \cos \alpha + b \sin \alpha = \sqrt{a^2 + b^2} \left( \frac{a}{\sqrt{a^2 + b^2}} \cos \alpha + \frac{b}{\sqrt{a^2 + b^2}} \sin \alpha \right) = B \sin(\alpha + \varphi)$$

Wherein $\sqrt{a^2 + b^2} = B \quad \frac{a}{\sqrt{a^2 + b^2}} = \sin \varphi \quad \frac{b}{\sqrt{a^2 + b^2}} = \cos \varphi \quad \varphi = arctg \frac{a}{b}$ $$B = \sqrt{(C_{11} - C_{12})^2 + C_2^2}$$

Fig. 29

$$R_{w,\infty}(\tau) = \frac{A^2}{4}\sqrt{(\frac{1}{\lambda}-\frac{\lambda}{\lambda^2+\omega^2})^2 + (\frac{\omega}{\lambda^2+\omega^2})^2}\ \exp(-\lambda\tau)\sin(\omega\tau+\varphi)$$

$$\varphi = arctg\frac{\omega}{\lambda}$$

$$\frac{A^2}{4}\sqrt{(\frac{1}{\lambda}-\frac{\lambda}{\lambda^2+\omega^2})^2 + (\frac{\omega}{\lambda^2+\omega^2})^2} = A^2\sqrt{1-\zeta^2}\,\frac{1}{4\lambda} = const \qquad (19)$$

Fig. 30

$$\zeta = \sqrt{\frac{(ln\frac{A_n}{A_{n+1}})^2}{(2\pi)^2 + (ln\frac{A_n}{A_{n+1}})^2}}$$

for $\zeta = 0.015$, coefficient $\delta = \frac{A_n}{A_{n+1}} = 1.1$

Fig. 31

$$\bar{\zeta}_n = (1-\frac{1}{M})\cdot\bar{\zeta}_{n-1} + \frac{\zeta_n}{M}$$

wherein $M$    Serves for setting the degree of "forgetness" of older measurements $\bar{\zeta}_n$    is an exponential average over $n$ measurements $\zeta_n$    is a result of the $n$-th measurement

Fig. 32

$$R_{yy}(k) = \frac{1}{N/2} \sum_{n=1}^{N/2} y(n) \cdot y(n+k) \quad \text{wherein} \quad k = 0,1,2,...,N/2-1 \quad (20)$$

wherein $\quad n = 1, 2, 3, ..., N \quad N = 2^i,$ Wherein $i$ is a natural number $$yp(n) = y(n) \quad \text{for} \quad n = 1, 2, 3, ..., N/2$$
$$yp(n) = 0 \quad \text{for} \quad n = N/2+1, ..., N$$

$$Y(j) = FFT[y(n)]$$

$$YP(j) = FFT[yp(n)]$$

$$Y_{YYP}(j) = Y(j) \, YP^*(j) \quad j = 1, 2, 3, ..., N$$

$$R_{yy}(k) = \frac{1}{N/2} FFT^{-1}[Y_{YYP}(j)] \quad \text{for} \quad k = 0,1,2,3,...,N/2-1$$

Fig. 33

$$Y(k) = \frac{1}{N} \sum_{n=0}^{N-1} y(n) \exp(-j \frac{2\pi}{N} kn) \quad k = 0,1,2,3,...,N-1$$

Fig. 34

```
1    BlockEnd = 1
2    BlockSize = 2
3
4    Do While BlockSize <= NumSamples
5      m = NumSamples / BlockSize
6
7      I = 0
8      Do While I < NumSamples
9        mb = 0
10       j = I
11       For n = 0 To BlockEnd - 1
12         K = j + BlockEnd
13         TR = cs(mb) * RealOut(K) - sn(mb) * ImagOut(K)
14         TI = sn(mb) * RealOut(K) + cs(mb) * ImagOut(K)
15         RealOut(K) = RealOut(j) - TR
16         ImagOut(K) = ImagOut(j) - TI
17         RealOut(j) = RealOut(j) + TR
18         ImagOut(j) = ImagOut(j) + TI
19         mb = mb + m
20         j = j + 1
21       Next
22
23       I = I + BlockSize
24     Loop
25
26     BlockEnd = BlockSize
27     BlockSize = BlockSize * 2
28   Loop
``` wherein

NumSamples -
BlockSize -
m -
mb -
sn(mb) – value of function sin(mb) retrieved from previously calculated table
cs(mb) - value of function cos(mb) retrieved from previously calculated table

Fig. 35

METHOD FOR IN-FLIGHT ASSESSMENT OF FREEDOM FROM FLUTTER OF AN AIRPLANE

The present invention relates to a method for in-flight assessment of freedom from flutter of an airplane.

Flutter vibrations are self excited aeroelastic vibrations of an airplane structure during flight. At certain flight velocities, aerodynamic forces related to vibrating movement, for example of a wing, may, for particular mass-stiffness properties of the construction, cause development of vibrations, for example bending-torsional forms of vibrations, leading to the destruction of the airplane.

Aviation regulations require to run in-flight flutter evaluations for new airplanes in order to document that the airplane is free from flutter. Presently, flutter evaluations are performed in such a way that the data are gathered from vibration sensors located on parts of the airplane structure during test flights and subsequently, after the flight is finished, the results of the data analysis are obtained. The known methods do not allow for in-flight assessment of freedom from flutter. Such a process is time-consuming and expensive, since it allows drawing conclusions only after the flight is finished and running evaluations for higher airplane velocities only during the next test flight.

Evaluation of flutter in flight should prove and document that the airplane is free from flutter within the whole range of planned velocities and altitudes. This is proven by providing damping coefficients values for the airplane structure vibration modes which are relevant for flutter.

An airplane approved for service must be resilient to flutter. It is assumed that the airplane is appropriately constructed in terms of flutter if the damping coefficients for the relevant vibration modes are higher than zero and not lower than $\zeta=0.015$. This value means physically that excited, self-attenuating vibrations, for example of a wing, should attenuate by about 10% amplitude decrease for each period of vibration in the whole range of approved flight conditions.

The known methods for evaluation of flutter damping coefficients involve artificial excitation of vibrations and post-flight analysis of these vibrations for flights with consecutively increasing velocities. Impulse, harmonic or stochastic excitations are used. This requires mounting of measurement apparatus on the airplane, increases evaluation costs and lengthens the evaluation time.

Flutter vibrations have a character of non-stationary signals, i.e. their spectrum properties vary in time—the variations may concern amplitude, frequency and phase. The variation in time of the spectrum vibration parameters may be self excited or artificially excited.

One of the methods for in-flight evaluation of flutter of an airplane involves vibrations of the airplane structure which are impulse-excited by using rocket actuators. Impulse responses are analyzed in order to determine the mode shapes of vibration and their damping coefficients. Impulse excitation is understood as excitation with a force of 200 to 2000 N during 10 to 50 milliseconds. An exemplary impulse response of an airplane in flight is shown in FIG. 1. The impulse responses are measured with vibration sensors.

Typical methods allow appropriate determination of average spectrum properties of a signal for relatively long periods of time. Fast Fourier Transform is commonly used for this purpose. However, typical Fast Fourier Transform algorithms are suitable for analysis of long segments of a signal and for high frequencies of the order of thousands of Hz. Therefore, they are not suitable for typical airplane flutter vibrations, which have a frequency of up to several tens of Hz. Hence, there exists a need for improving the method of Fast Fourier Transform calculation in order to achieve improved resolution in lower ranges of frequencies.

Moreover, it has been theoretically proved that the impulse response of a monitored object may be substituted with a self correlation function (also called an autocorrelation) of a stochastically excited signal. Assuming that the vibrations of wings or of a tail-plane of an airplane during flight have the properties of stochastically excited vibrations, the damping coefficients may be estimated based on analysis of estimates of the self correlation function (and the estimate of the autocorrelation function). The following publications are related to this topic:

Uhl T., Lisowski W., Kurowski P.: *In-Operation Modal Analysis and its Applications*. Katedra Robotyki i Dynamiki Maszyn. Akademia Górniczo-Hutnicza w Krakowie. Kraków 2001.

Hermans L., Van der Auweraer H.: *On the Use of Auto-and Cross-correlation Functions to Extract Modal Parameters from Output-only Data*. In Proceedings of the 6$^{th}$ International Conference on Recent Advances in Structural Dynamic. Work in progress paper, University of Southampton, UK, 1997.

There are known methods for calculating the estimate of autocorrelation for stationary signals. However, these methods change the damping coefficients values of the source signal of actual vibrations.

There are commonly used equations for calculating correlation function for stationary, ergodic, stochastic processes with the use of a single run of the stochastic process sufficiently extended in time. A self correlation function of a process y(t) can be calculated using equation (1) shown in FIG. 2.

A stationary process has a constant average value $m_y$ in time and a constant variance in time. A stationary process is ergodic when the time averages are equal to the ensemble averages over the range of the stochastic process realization.

However, the above equations are applicable to an infinitely long vibration signal. A self correlation function of such signal preserves the frequencies and modal damping coefficients of the evaluated object.

However, during in-flight measurements, the measured segments of vibrations are always finite. The estimates of autocorrelation function of such signals change their damping coefficients. In such cases the existing estimates of autocorrelation function introduce methodical errors, unequivocally related to individual estimates. The analysis of actual vibrations signals further introduces errors resulting from measurement errors and from the fact that in-flight vibrations excitements are not exactly a stationary white noise.

It is the object of the present invention to provide a method for assessment of freedom from flutter of an airplane with a use of such algorithms that allow real-time evaluation in flight.

The object of the invention is a computer implemented method of in-flight assessment of freedom from flutter of an airplane, involving analyzing the airplane structure vibrations based on signals indicated by sensors located on the airplane structure. The computations are performed in real-time based on current measurement data collected from the sensors, wherein for measurement data from individual sensors there are determined mode shapes of vibrations by determining for each mode shape a natural frequency (f), a damping coefficient ($\zeta$), a phase ($\phi$) and an amplitude (A) by using a method of least squares of errors of time signals, wherein the relevancy of the modes of vibrations is determined by subtracting from the vibrations signal the particular mode of vibrations and calculating the value of decrease of the rest sum of squares. The airplane structure vibrations are evaluated by analyzing impulse responses or estimates of autocorrelation function for operational vibrations signals, wherein the autocorrelation function $R_{yy}(l)$ is computed by multiplying a constant number of samples, preferably N/2, of the vibrations signal $(y_n)$ by successive segments of the vibrations signal $(y_n)$, each segment having a size N, and by summing the results according to the equation:

$$R_{yy}(l) = \frac{1}{N/2} \sum_{n=1}^{N/2} y_n \cdot y_{n+l}$$

$$n = 1, 2, 3, \ldots, N$$

$$l = 0, 1, 2, \ldots, N/2$$

in order to obtain an autocorrelation function $R_{yy}(l)$ having the length of a half of the evaluated segment of vibrations while maintaining the values of the damping coefficients of non-stationary signals having a finite duration.

Preferably, the autocorrelation function $R_{yy}(l)$ is calculated with a use of Fast Fourier Transform according to the equation:

$$R_{yy}(k) = \frac{1}{N/2} FFT^{-1}[Y_{YYP}(j)] \text{ for } k = 0, 1, 2, 3, \ldots, N/2 - 1$$

$$Y_{YYP}(j) = Y(j)YP^*(j)$$

$$j = 1, 2, 3, \ldots, N$$

$$Y(j) = FFT[y(n)]$$

$$YP(j) = FFT[yp(n)]$$

$$yp(n) = y(n) \text{ for } n = 1, 2, 3, \ldots, N/2$$

$$yp(n) = 0 \text{ for } n = N/2 + 1, \ldots, N$$

wherein n=1, 2, 3, ..., N $N=2^i$, Wherein i is a natural number

Preferably, the sampled segment of the signal having the length of N samples is zero-padded in order to obtain an output sequence having the length of $N_{sum}=2^i$, wherein i is a natural number and the Fast Fourier Transform is calculated for the output sequence.

Preferably, the Fast Fourier Transform is calculated by using tables of values of sine and cosine functions for angles dependent on the number of samples and on the sampling frequency, prepared after the start of the system.

Preferably, an image visualizing the vibrations measured by the sensors is generated, the image comprising an image of the airplane structure and its deviations resulting from the vibrations, whereas the deviations having parameters above threshold values are marked with a color different than the color of the deviations having parameters below the threshold values.

Preferably, the vibrations are visualized by using a method involving calculation of a phase shift or a method involving calculation of a movement phase at specified points in time.

The object of the invention is also a measurement system for in-flight assessment of freedom from flutter of an airplane equipped with vibrations sensors located on the airplane structure, wherein the system comprises signal processing circuits for performing the method according to the invention.

The object of the invention is also a computer program comprising a program code for performing all of the steps of the method according to the invention when the program is run on a computer.

The solution according to the present invention involves a data processing method, which allows evaluation of aeroelastic properties of an airplane during in-flight flutter assessment. This increases the safety of flutter tests during flight and decreases the time necessary to run the tests, which significantly decreases the costs of production of an airplane. The analyses are run within a second after measurements of vibrations covering a period of one or a few seconds, thereby facilitating quick responsiveness in the case of detection of any tendency to dangerous flutter vibrations.

Mode shapes of vibrations are determined in an efficient way by subtracting predefined modes of vibrations from the evaluated signal and verifying whether after the subtraction the rest sum of squares has decreased by a predefined threshold value.

The disclosed method for calculating the self-correlation function, based on finite segments of vibrations, preserves the natural properties of the modal modes of vibrations of the evaluated signal and preserves the values of damping coefficients and natural frequencies of the evaluated object. The calculations can be made more quickly by means of a Fast Fourier Transform.

The presented method for calculating the autocorrelation function is suitable for analysis of vibrations that are increasing and self-attenuating, or analysis of normal vibrations during exploitation of the airplane conducted for analysis of the current dynamic properties of the airplane.

Figure 6:
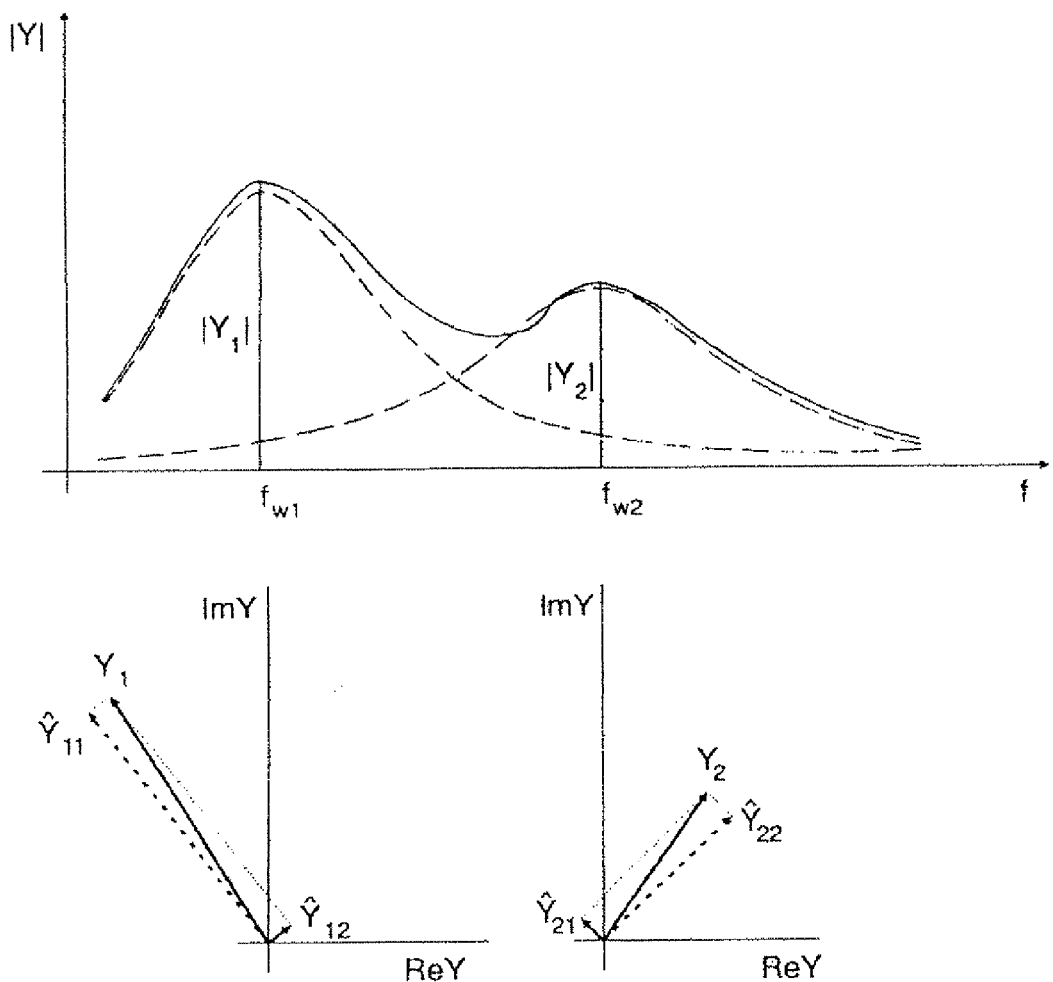
Figures 7, 8:
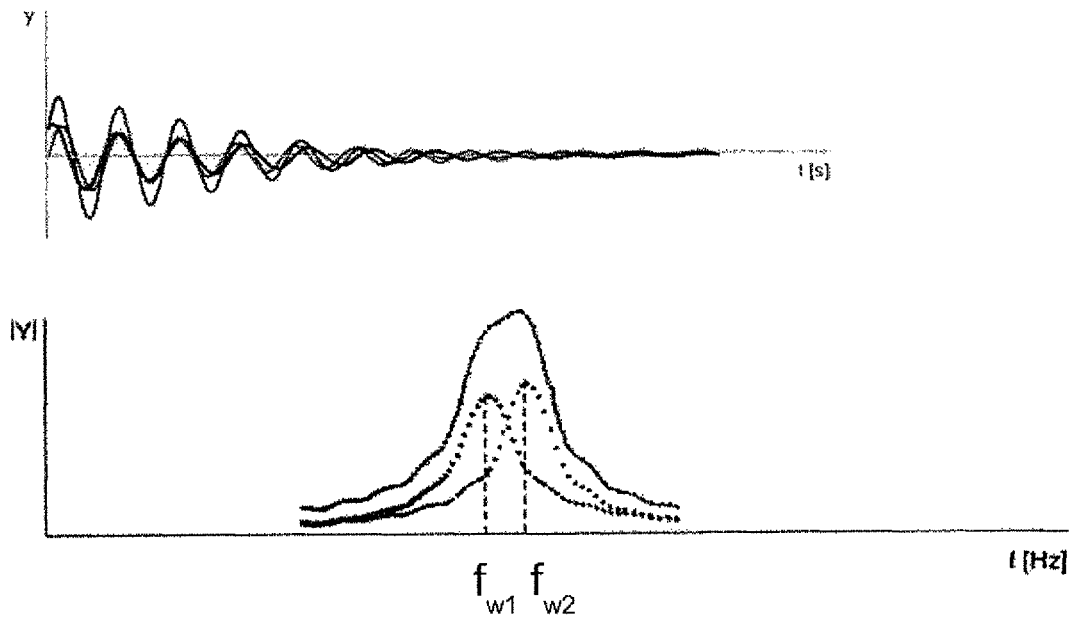
Figures 11, 12:
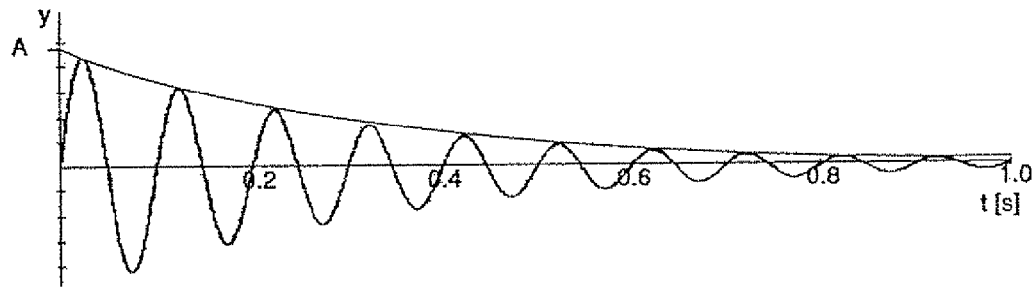
Figure 13A:
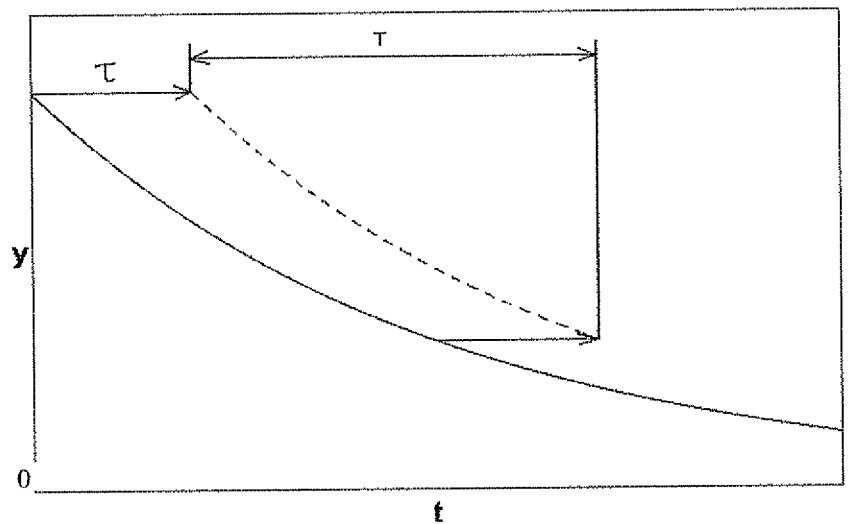
Figure 13B:
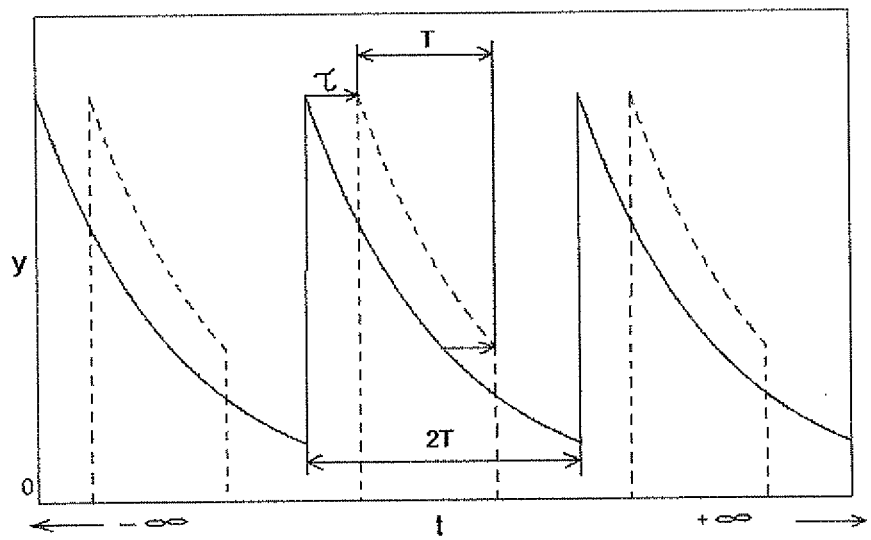
Figures 14, 15, 16:
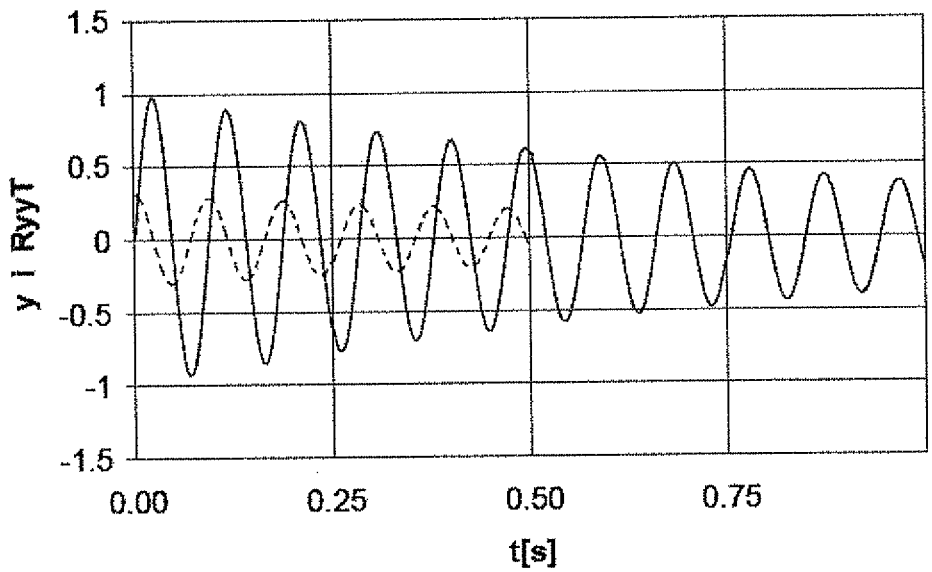
Figure 36:
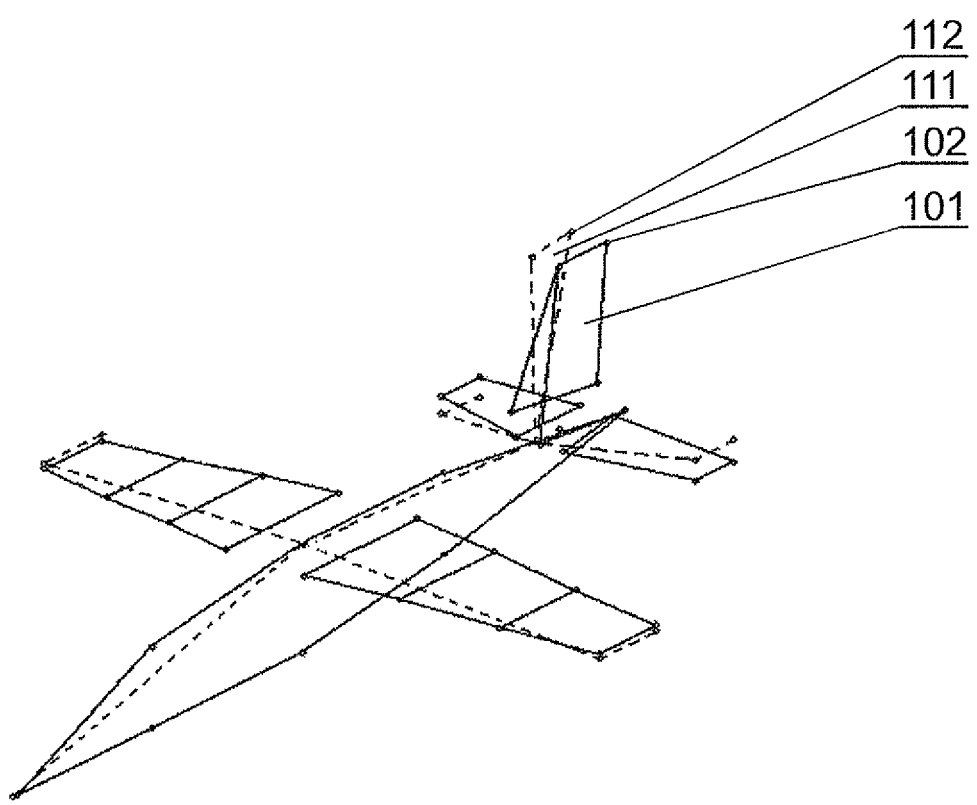
Figure 37:
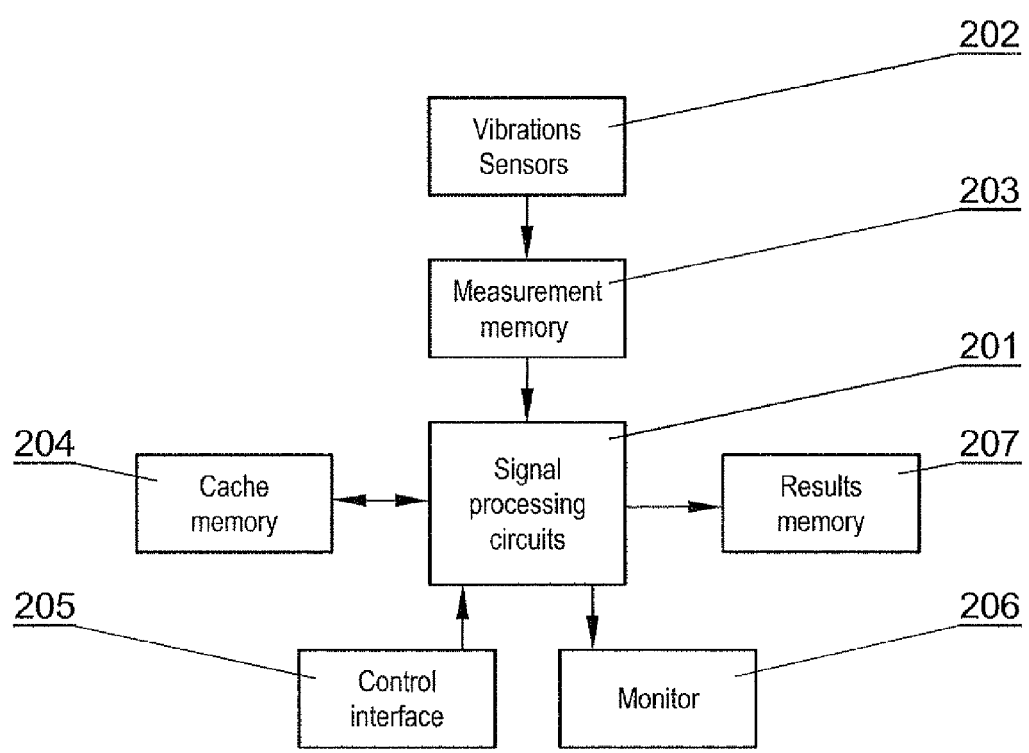

The invention is shown by means of an exemplary embodiment on a drawing in which:

FIG. 1 presents an exemplary impulse response of an airplane structure in flight;

FIG. 2 presents an equation for determining the self-correlation function of the process y(t);

FIG. 3 presents a mathematical model ŷ(t) for determining a finite sum of natural vibration modes;

FIG. 4 presents an equation for calculating the rest sum of squares (RSS) and its derivatives;

FIG. 5 presents continuation calculation of derivative of the RSS;

FIG. 6 presents graphically the equation (9) for two modes;

FIG. 7 presents the equations (9) in a frequency domain;

FIG. 8 presents a transform of a time signal comprising two mode shapes of vibrations;

FIG. 9 presents a sequence of transformations of a signal y(t) in order to obtain the phase φ equation;

FIG. 10 presents one form of the y(t) function;

FIG. 11 presents calculation of the amplitude A at the initial point of analysis window;

FIG. 12 presents equations for calculating the amplitude A;

FIGS. 13A and 13B present examples of calculation of the self-correlation function for the function y(t);

FIG. 14 presents an exemplary plot of an attenuating signal and its autocorrelation;

FIG. 15 presents estimate of the self-correlation function in the form of a sum;

FIG. 16 present estimate of the self-correlation function in form of an integral;

FIG. 17-20 present equations related to the impulse response;

FIG. 21 presents an analytical equation of a self-correlation function;

FIG. 22-30 present an example of calculating the self-correlation function and the calculation results;

FIG. 31-32 present computations of vibrations damping coefficient $\zeta$;

FIG. 33 presents an equation for calculating self-correlation function $R_{yy}(k)$ using FFT method for realization of the stochastic process $y(n)$;

FIG. 34 presents the most common equation for calculating the discrete Fourier transform;

FIG. 35 presents an algorithm for calculating the Fast Fourier Transform;

FIG. 36 presents an exemplary visualization of operational modes of vibrations;

FIG. 37 presents an example of a computer system for carrying out the method according to the present invention.

DETERMINING MODE SHAPES OF VIBRATIONS AND THEIR DAMPING COEFFICIENTS

The signals measured by vibrations sensors are analyzed in order to determine the mode shapes of vibrations and their damping coefficients.

Assuming that an object is linear, for small deviations from a balanced state, each freely vibrating movement of the airplane structure is composed of a sum of movements related to mode shapes of vibrations. For airplanes for which the vibrations amplitude of the end of the wing, after impulse excitement, does not exceed for example 2 mm, the assumption of linearity is justified. It is assumed that a registered free movement of attenuating vibrations, after an impulse excitement, may be described with a mathematical model $\hat{y}(t)$ defining a finite sum of natural modes, as shown in FIG. 3.

The relative damping coefficient $\zeta$ is the main value, which has been used as a measure of resilience to flutter vibrations.

The real object has an infinite number of modes of vibrations, whereas the registered result of measurement has a finite number of modes due to the constraints of the measuring circuit. Numerical calculations also reduce the number of analyzed modes due to the discrete nature of measurements.

The initial assumption of the linearity of the object does not preclude the possibility of detecting nonlinearity, by e.g. determining the relationship between e.g. the damping $\zeta$ and the value of the amplitude of vibrations, by measuring the temporary properties of the object while the vibrations attenuate after impulse excitement.

Equations $\hat{y}(t)$ of FIG. 3 are finite Fourier series, the modes of which are the shapes of natural vibrations of the airplane.

The problem of identification of the parameters of the model of the object can be solved by defining the values of: amplitudes $A_p$, frequencies $\omega_{wp}$, damping coefficients $\zeta$ and phase angles $\phi_p$ of individual mode shapes of vibrations in the analyzed registers of attenuating vibrations.

Having a formulated mathematical model $\hat{y}(t)$ of the physical setup under evaluation and the actual time plots $y(t)$, the parameters of mode shapes of vibrations may be determined from the rule of minimization of rest sum of squares (RSS), represented by the equation shown in FIG. 4.

By comparing to zero the derivatives of this sum versus all parameters sought, a set of non-linear equations is obtained. For P mode shapes, a set of 4P equations is obtained. It is however not necessary to calculate natural frequencies from such an extended set of equations. For determining the natural frequencies, Fourier transforms may be used.

The method for determining optimal parameters of the model $\hat{y}(t)$ can be based on a modified method for searching for optimal coefficients of Fourier series for a given function $\hat{y}(t)$.

For a Fourier series, a set of harmonic functions is assumed and optimal values of coefficients $a_p$ and $b_p$ are sought.

Having a set of modes of vibrations, the optimal amplitudes of these modes of vibrations can be found. The only difference is that a time-variable amplitude is present here. In the further part of FIG. 5 it is shown how to calculate a derivative of the RSS versus $a_{pt}$ and $b_{pt}$ in order to seek such coefficients, variable in time, which also depend on the influence of $f_{wp}$ and $\zeta_p$ parameters.

The sums having a form (4, 5) as shown in FIG. 5, after multiplication by a 2/N coefficient, form a discrete Fourier transform for the natural frequency $\omega_{wp}$ for the p-th mode, made for a finite length of the signal $y_n$. The coefficient 2/N results from a property of the discrete Fourier transform and from the equation for Fourier series coefficients.

The sets of equations (2) and (3) of FIG. 4, after multiplication at both sides by 2/N may be formulated as equations (6) and (7) shown in FIG. 5.

It can thus be confirmed that starting from the least squares method in the time domain, a set of equations in the frequency domain has been obtained.

The best estimations of mode shapes of vibrations are obtained from the rules that the real part of the signal transform at point $f_p$ equals the sum of the real parts of transforms of mode shapes of vibrations at this particular point of the spectrum of vibrations. Similar relationships apply to the imaginary part of the Fourier transform.

In order to diagonalize the matrix of the set of equations, equations (7) from FIG. 5 multiplied by an imaginary unit with a minus sign (−j) are added to equations (6) to obtain a set of equations (8) shown in FIG. 5, further presented in a vector form (9), wherein Y denotes a transform of the particular time function.

The set of equations (9) may also be obtained by comparing the signal $y(t)$ to a sought model $\hat{y}(t)$ and by performing a Fourier transform for the natural frequencies of successive modes. However, such a process does not show that the set of equations (9) results from the method of least squares of errors.

In FIG. 6 the equation (9) for two modes is presented in a graphic form. In FIG. 6 the transform module of the first mode of vibrations is dominant at point $f_{w1}$, and the transform module of the second mode of vibrations is dominant at point $f_{w2}$.

For the data presented in FIG. 6, the minimization of the sum of squares of errors in the time domain leads to a set of equations in the frequency domain as shown in FIG. 7. These are vector equations for natural frequencies $f_{w1}$ (the first equation) and $f_{w2}$ (the second equation).

The matrix of the set of equations (9) is similar to a diagonal matrix. The diagonal comprises words $\hat{Y}_{w1,1}, \hat{Y}_{w2,2}, \ldots, \hat{Y}_{wP,P}$. The remaining words are usually significantly lower. Therefore, in the first approximation there may be assumed equations (10) shown in FIG. 7.

From the equations (10), the first approximation of the sought mode shapes of vibrations may be determined.

The second approximation may involve the influence of the neighboring and further modes, which were calculated in the first approximation, on the value of transforms at individual points $f_{wp}$.

In the third approximation, all modes calculated in the second approximation are included, etc.

The Fourier transform of an impulse response of the evaluated object may be the source of information on the natural frequencies.

The maximum values (resonance peaks) indicate the locations of natural frequencies. The influence of the neighboring modes on the positions of the peaks is low if the modes are spaced apart from each other. If the vibrations of a wing of the airplane are measured using a strain gauge circuit, which registers only the bending, then the measured modes are spaced apart from each other. The strain gauge circuit for measuring the torsion of a wing also registers only torsional modes spaced apart from each other (FIG. 8).

Acceleration sensors located e.g. on the line of junctions of the torsional mode also register only the bending modes spaced apart from each other. If two acceleration sensors are located on one wing chord and equally spaced from the torsional axis, then by adding their readings, the bending mode can be eliminated, and by subtracting their readings, the torsional mode can be eliminated and the bending mode can be amplified twice.

It is, however, not possible to determine accurately the natural frequencies that are located very closely to each other, when the transform modulus comprises only one peak instead of two neighboring peaks, as shown in FIG. 8. The transform, as shown in FIG. 8, of the time signal comprising two mode shapes of vibrations has only a single maximum (solid line). The existence of resonance peaks depends strongly on the phase shift of the modes of vibrations. In FIG. 8, the modes of vibrations have starting amplitudes $A_1=15$ and $A_2=15$, the frequencies $f_{w1}=10.5$ Hz and $f_{w2}=11.5$ Hz, damping coefficients $\zeta_1=0.05$ and $\zeta_2=0.04$. $\phi_1=1$, $\phi_2=0$.

When recording an impulse response having an attenuation time of about 1 s, there may appear problems with appropriate determination of two modes separated by less than 1 Hz. By employing the aforementioned measurement methods, it is possible to prevent such problems in practice. The frequencies determined in the first approximation from the set of equations (10) are corrected in successive iterations including the influence of neighboring modes on the location of resonance peaks.

For natural frequencies determined this way, damping coefficients may be calculated by using the known methods, for example by using Fourier transform as presented in the following publication: Lenort F. "*Application of Fourier Transformation to Flutter Tests*", Journal of Theoretical and Applied Mechanics, No. 4/94, Warszawa 1994. A known impulse response of an object allows determining the preliminary values of $f_{wp}$ and $\zeta_p$ of successive modes of vibrations present in the evaluated signal.

Determination of Phase

The calculated frequencies $f_{wp}$ of the natural vibrations serve as the preliminary information on the actual modes of vibrations. Based on the ground vibration tests (GVT), the individual frequencies $f_{wp}$ can be associated with particular modes of vibrations: the first bending, the second bending, the first torsional, etc.

For a detailed evaluation, having several sensors located on a wing, with two sensors per selected wing chords, by using Fourier transforms, the phases of movement of the selected construction points may be determined for individual modes of vibrations at a particular moment in time.

In the mathematical model as shown in FIG. 3, the values $\phi_p$ may be used to determine the modes of vibrations. If in the starting point of the analysis window, the angles $\phi$ from two sensors located on a single wing chord have the same value, it means that they are in phase and the movement of that given frequency is a bending movement. If the phases $\phi$ differ by 180°, then the analyzed movement is a torsional movement.

Determination of the value $\phi_p$ is required for full identification of the parameters of the mathematical model. Fourier transform can be used to determine the value $\phi_p$.

FIG. 9 presents a sequence of transformations of signal y(t) to obtain the equation for phase $\phi$, from which it can be derived that by having calculated the real and imaginary part of Fourier transform for a given natural frequency $\omega_w$, the phase $\phi$ of the function y(t) can be determined at the starting point of the analysis window.

When the function y(t) represents a damped sinusoidal, the equation for determining the phase $\phi$ is burdened with a certain error. However, the error may be removed by knowing in advance the damping coefficient $\zeta$. A function in the form presented in FIG. 10 may be, before calculating the value $\phi$, multiplied by the function $\exp(\lambda t)$, in order to remove the exponential factor in the function y(t).

The phase $\phi$ of a single mode shape of vibrations may be therefore calculated accurately. In the case of multiple modes, the result is burdened with an error of the influence of the neighboring modes. This influence may be removed in subsequent iterations by removing from the signal the neighboring modes, calculated in the previous iteration.

Determination of Amplitude

After the values $f_w$, $\zeta$ and $\phi$ are successively calculated for the analyzed mode, for the case of a function with a single isolated mode, the amplitude A may be accurately calculated for the starting point of the analysis window, as shown in FIG. 11.

By calculating the Fourier transform at point $f_w$, the equation for the amplitude A can be obtained, in which F denotes a simple Fourier transform.

In case the other modes influence the result of calculation, the value A calculated in the first approximation from the equation of FIG. 12 is corrected in the subsequent approximations by removing the remaining modes calculated in the previous approximation.

Determination of Flutter Vibrations

The use of the method of the least squares of errors in the time domain leads to a set of equations in the frequency domain. The individual equations of that set of equations correspond to Fourier transform properties at successive points $f_{w1}, f_{w2}, \ldots, f_{wP}$. At these points, the transform of the signal y(t) is a vector sum of transforms of mode shapes of vibrations. In these sums, the mode having the frequency matching the successive values of $f_w$ plays a dominant role.

Therefore, as the first approximation it can be assumed that the modes are appropriately isolated and their parameters can be calculated independently from the other modes.

For such isolated modes, precise formulas for determining the individual parameters: $f_w$, $\zeta$, $\phi$ and A may be compiled. The sequence of calculating these parameters should not be random. The parameters shall be calculated exactly in this order: $f_w$ must be known to calculate $\zeta$; $f_w$ and $\zeta$ must be known to calculate $\phi$; and, $f_w$, $\zeta$ and $\phi$ must be known in order to calculate the amplitude A.

Before calculating the parameters of the second mode of vibrations in the first approximation, the calculated first mode may be removed from the signal (subtracted) in order to remove its influence on the neighboring resonance peaks. The second mode, having been calculated, may also be removed from the signal before calculating the third mode, etc.

In the second approximation, before calculating the first mode, all remaining modes calculated in the first approximation are removed from the signal in order to avoid their influence on the calculated first mode. After the first mode in the second approximation is calculated, it is removed from the source signal and the third and further modes obtained from the first approximation are removed as well. Thereafter, the second mode is calculated in the second approximation.

The above rules are maintained in further approximations. After the successive mode is removed, the rest sum of squares (RSS) is calculated in the next approximation. The value of RSS is used for evaluating the relevance of individual modes of vibrations.

For actual signals, the appropriate way to calculate a mode is to start from the mode having the lowest value of $f_w$, because of its highest contribution to the total variability.

The modes of vibrations to be classified as relevant are the modes that, when subtracted from the vibrations signal, result in a decrease of the rest sum of squares (RSS) by a value not lower than a threshold coefficient, for example 5%.

For typical, model impulse responses, the calculation results are correct. The accuracy of calculations depends on the sampling frequency of the time signal and on the signal length (on the time of attenuation of the signal). The calculations time is lower than one second.

A Method for Calculating Estimate of Autocorrelation

Vibrations signals may be analyzed directly or by analysis of their autocorrelation function.

The method according to the present invention utilizes calculation of estimate of autocorrelation based on finite segments of vibrations, which preserves the values of the damping coefficients of the vibrations signal and is suitable for non-stationary signals. In addition to stationary signals, there may be freely decaying signals or increasing signals. It is a tool suitable for the so-called time-frequency analysis, for assessment of the momentary properties of non-stationary signals.

A new estimate of the self correlation function has been employed in the method according to invention, which eliminates the methodological errors of evaluation of the damping coefficients known from the estimates used so far.

The new estimate is based on the fact that, with a measured and sampled segment of vibrations, the first N/2 samples are collected and shifted along the whole segment. After each shift by one sample, the values of samples accruing on each other are multiplied and the 1 to N/2 products are summed. The obtained sum is divided by N/2.

For a zero shift, the first point of the estimate of autocorrelation $R_{yy}(0)$ is obtained. The points of the shifted segment having the size of N/2 have been located exactly over the first half of the complete segment.

The last point of the proposed estimate is obtained when the shifted segment is located exactly over the second half of the complete segment of vibrations ($R_{yy}(N/2)$).

For a vector of vibrations signal having the size of N points, there are obtained N/2+1 points of estimate of autocorrelation function (when N is even).

Taking into account the properties of a given signal, the length of the shifted segment may be increased. In such a case, a shorter segment of autocorrelation function is obtained. In turn, by decreasing the length of the segment which is shifted, the length of the obtained autocorrelation function is increased.

If a Fast Fourier Transform (FFT) is used for calculating the autocorrelation function, then N shall fulfill the requirement of $N=2^m$ where m is a natural number.

The proposed estimate of the self-correlation function may be formulated in the form of a sum with the use of the equation (12) shown in FIG. 15.

The proposed estimate of the self-correlation function may be formulated in the form of an integral with the use of the equation (13) shown in FIG. 16.

An example of rules for calculating a self-correlation function for a function $y(t)=\exp(-\lambda t)$ is shown in FIG. 13A. The solid line denotes the function y(t). The dashed line denotes the first half of the signal y(t), shifted along the time axis. The first point of the autocorrelation function is obtained for $\tau=0$, and the last for $\tau=T$.

In turn, in FIG. 13B there is shown an exemplary set of rules for calculating the self-correlation function for the function $y(t)=\exp(-\lambda t)$, with the use of Fast Fourier Transform (FFT). The solid line denotes a periodic function y(t) having period 2T and the dashed line denotes a periodic function y(t) from 0 to T filled with zeros from T to 2T.

Proving that the New Method for Calculating Autocorrelation Estimate is Appropriate For the prior art methods used for infinitely long vibrations signal, it has been shown that the self-correlation function may replace the unknown function of impulse response of the evaluated object.

When proving that a self-correlation function may replace the unknown function of impulse response of the evaluated object, it was necessary to calculate an infinite integral (from 0 to $+\infty$) of a product of two impulse responses. The result of this action was an impulse response preserving the natural modal values (frequency and damping coefficient).

The proposed integral estimator (equation 3) also preserves the natural values (frequency and damping coefficient), even based on a finite vibrations signal, which will be proved below.

An impulse response may be assumed in the form of equation (14) shown in FIG. 17. The further calculations are shown in FIG. 18. Integral equations are shown in FIG. 19 and their use for calculation of the function is shown in FIG. 20.

The analytical equation for the self-correlation function can be also written in the form (15) as shown in FIG. 21.

Formally, time in equation (15) can be denoted as "t" instead of "$\tau$". It can be readily seen that the estimate of the autocorrelation function $R_{yy,T}(\tau)$ as calculated according to the proposed method, is a freely decaying signal having the same damping frequency coefficient $\zeta$ and the same natural frequency value $\omega_d$ as the processed signal y(t).

The constant coefficient A has been replaced with a constant C, and the phase $\phi=0$ at the beginning of the signal has been replaced according to equation (16): for a non-attenuated signal, when $\zeta=0$, the phase of such sinusoid equals $\pi/2$ rad. The non-attenuated sinusoid is replaced with a non-attenuated cosinusoid, as follows from the theory.

It should be noted that a correct result has been obtained, i.e. the preservation of natural properties for a finite impulse response signal: for a non-stationary signal.

The equation (16) defines that the starting phase of the self-correlation function is unambiguously dependent on the damping coefficient. For a fading signal y(t), the autocorrelation signal starts with its maximum value. For example, for $\zeta=0.015$, the autocorrelation function expressed as a sine function starts with an initial phase of $\phi=1.5558$ rad. For an increasing y(t) signal, its autocorrelation function does not start with its maximum (the function is also an increasing function). For example, for $\zeta=-0.015$ the initial phase is $\phi=1.5858$ rad. The attenuated sinusoid of the initial phase $\phi=0$ has its first maximum for a phase $\phi=\arccos\zeta$. The further maxima fall at points $\phi+n\cdot 2\pi$, $n=1, 2, 3, \ldots$.

Referring back to the obtained analytical equation for the self-correlation function (15), in FIG. 14 there is shown an exemplary plot of a fading signal according to the equation (14), denoted with a solid line and its self correlation function, denoted with a dashed line, for A=1, $\zeta=0.015$ and $f_d \approx f_0=10.6$ Hz.

For T=1 s, the autocorrelation function (the dashed line) is calculated only in the range of $0 \leq \tau \leq T/2$. The value of the damping coefficient $\zeta$ and the frequency $f_d$ of the autocorrelation signal are the same as for the signal y(t). There has been a change in the amplitude and the initial phase.

Analysis of the equation (14) leads to a conclusion that for $\zeta=0$ and A=2 the amplitude of the autocorrelation function remains the same: C=2. In general, for amplitudes A greater than 2, the amplitudes are increased, in line with equation (15), and amplitudes lower than 2 are decreased. This is an advantageous feature of the autocorrelation function, as it eases decomposition of the assumed impulse response signal or other freely decaying signals and vibrations signals during normal operation of an airplane in flight. The white noise is practically fully removed, the autocorrelation function is smoother than the source vibrations signal.

It will be shown below how to utilize the proposed method for calculating the self-correlation function for a fading signal having infinite length when $T\rightarrow+\infty$.

An integral has to be considered according to the equation (17) shown in FIG. 22, wherein y(t) is a signal according to the equation (14).

The calculation results are shown in FIG. 23.

As can be seen, the proposed method for calculating the self correlation function transforms an infinite exponentially fading signal into an infinite signal of the same frequency and of the same damping coefficient.

Assuming the same signal according to the equation (14), defined in a finite range 0 δt δT, and calculating with the use of the current "unbiased" estimator of the autocorrelation function (1), i.e. calculating an integral according to the equation (18) in FIG. 24, leads to a result in a form shown in FIG. 25.

Figure 26:
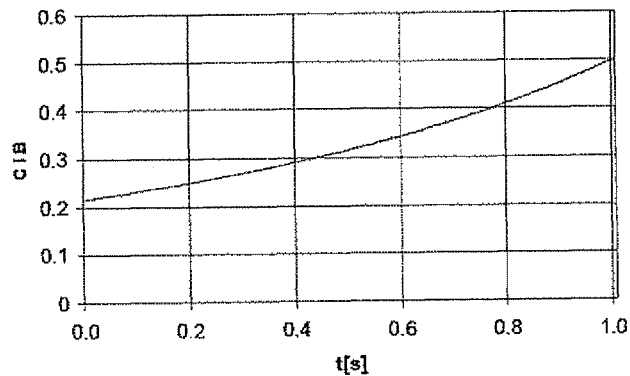

A time plot for values according to the equation (19) in FIG. 25 is shown in FIG. 26—the curve C matches the curve B according to the equation shown in FIG. 19.

In this example, the estimator of the self-correlation function is the function resulting from multiplication of a exponentially fading sinusoid and an increasing function C, which in this example decreases the speed of fading of the sinusoid and changes its nature of variation in time—it is not purely exponential fading.

Figure 27:
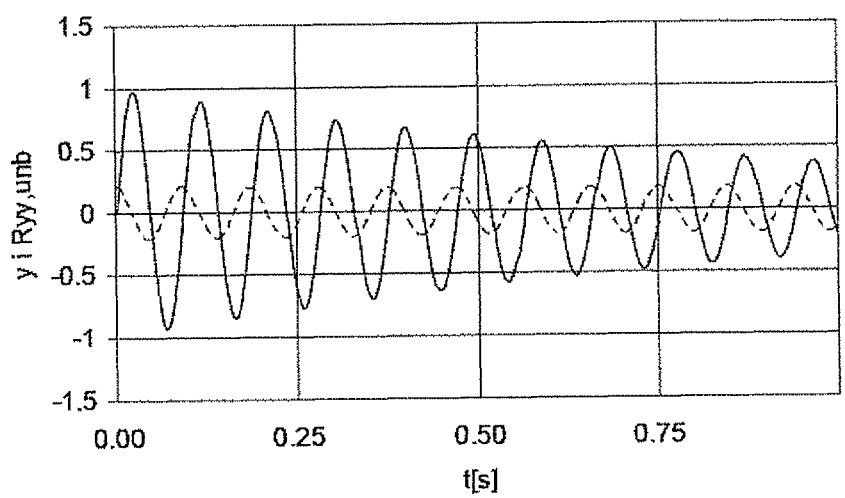

FIG. 27 shows a plot of a signal y(t) according to the equation (14) (solid line) and a plot of its self-correlation function $R_{yy,T\text{-}\tau\text{-}}$ (dashed line) for T=1 s. As can be seen, the autocorrelation function fades more slowly than the signal y(t), and has a lower damping coefficient.

The integrals C12 and C2 have been solved above for a case which significantly simplifies the form of the result, i.e. for a case where $T=k\cdot T_{okr}$. This simplification did not, however, introduce visible errors in calculation shown in FIG. 26. In this particular example, the numerical results differ only by the fourth most significant digit.

In order to simplify the formulas and increase their clarity, there have been assumed notations λ and ω as shown in FIG. 28, as well as an equation for an integral $C_{11}$, also shown in FIG. 28. The integral $C_{11}$ has a crucial meaning in the analytical form of the autocorrelation function. Formulating the equation for integral $C_{12}$ is shown in the further part of FIG. 28. In the integral $C_{12}$, the value under the root in the denominator is so high in comparison to the values in the nominator, that the integral $C_{12}$ is negligible in comparison to the integral $C_{11}$ for typical measurement data.

The form of integral $C_2$, shown in the subsequent part of FIG. 28 for any value of T, is also negligibly small in comparison to integral $C_{11}$.

By inserting the values of the integrals to the equation for the value of the self-correlation function, the equation shown in FIG. 19 is obtained. By inserting to this equation the corresponding equations for $C_{11}$, $C_{12}$ and $C_2$, an equation for assessment of amplitude B is obtained. It can be examined whether the amplitude B is independent of the shift τ, or whether it depends on τ and how.

If $C_{11}$, $C_{12}$ and $C_2$ are substituted according to the formulas in FIG. 28, where the upper integration limit is constant and equals T, as it is proposed in the method for autocorrelation function calculation, then all the formulas are constant values, independent of τ and the amplitude B is constant. In the resulting autocorrelation function, the vibrations damping coefficient ζ is preserved.

If in the formulas $C_{11}$, $C_{12}$ and $C_2$ there is substituted, in place of the constant T, a variable integration limit T–τ, as in the classic method for calculating autocorrelation function, then the amplitude B is a value dependent on the shift τ. FIG. 26 shows, for exemplary purposes, the amplitude B as a function of the shift τ for given values A, f and ζ.

For an infinite analytical signal (FIG. 22), a self-correlation function in the form shown in FIG. 30 can be obtained.

The expression (19) defines a constant value and therefore the calculated self-correlation function preserves the damping coefficient of the analyzed signal y(t).

Requirements with Respect to Evaluation of Vibrations Damping Coefficients

Aviation regulations require that for the in-flight airplane structure vibrations, the damping coefficients ζ for modes of vibrations that are relevant for flutter, should be greater than 0.015.

As it is known, physically the coefficient ζ is unambiguously related to the decrease in amplitudes of impulse response, to the decrease in freely decaying vibrations, according to the equation in FIG. 31. This shows that the regulation requirements may be formulated as follows: each excited and then freely decaying vibrations, of an airplane structure in flight, should fade with a decrease in amplitude by about 10% during a single vibrations period.

For the coefficient value of ζ=0.707, each deviation of the setup from a balance point results in a slow return to the balance point, without vibrations. Such a value of vibrations damping may be assumed for evaluation of relative measurement error of damping coefficient.

The measurement of the value of ζ=0.015±0.005 means that a relative measurement error is 0.7%. The value of the damping coefficient ζ is also given in %. The measurement result ζ=(1.5±0.7)% means a measurement with a relative error of 1%.

It is usually required to have, in a segment of analyzed vibrations, at least 10 vibrations periods having a top evaluated frequency $f_g$, and to have in the bottom range of the vibrations $f_d$ at least 20 samples of the evaluated signal in a single vibrations period. Therefore, if the band of vibrations of interest is for example from $f_d$=5 Hz to $f_g$=50 Hz, then the analysis should include at least 2000 samples, the sampling frequency $f_{pr}$ should be 1000 samples per second and the segment of analyzed vibrations should have a length of 2 s. Generally, the number of samples should amount to $N \geq 200 \cdot f_g/f_d$. These requirements allow calculating the autocorrelation function with an error of about 2%.

Assumptions and Rules During Flutter Assessment in Flight

The use of correlation function belongs to a group of methods based on passive experiment, i.e. based on passive observation of object outputs without compromising the natural circumstances of object operation.

In this method, it is assumed that the object under test is linear and has constant coefficients, invariable in time. It is assumed that the input signals and interferences are stationary, ergodic and stochastic processes.

Stationary processes are stochastic processes that have a constant, expected value independent with regard to time, constant time variation and a self-correlation function independent with regard to time and dependent only on the shift τ.

In the case of airplane vibrations, the linearity of the object, i.e. invariability of the damping coefficient and the natural vibrations frequency, is not fully accomplished.

The natural frequencies of wings in flight change along with the amount of fuel in integral or underwing fuel tanks. In training airplanes, the change amounts to approximately 10%. Initially, the frequencies are lower and in the end higher, according to the change in weight.

In such a case, the advised long-lasting measurement does not make any sense. This would lead to averaging the actual values of, for example, 11 Hz at the beginning of the flight and 12 Hz at the end of the flight, to the value of 11.5 Hz.

Therefore, it would be advantageous to provide such methods for identification that allow appropriate evaluation of damping and frequency for short segments of vibrations signals. This is the aim of the work presented herein. This requirement is also advantageous for the industry, where real-time in-flight assessment of freedom from flutter of an airplane is needed.

In practice, it is possible to use a method which is based on momentary analysis of short segments of a signal and which further involves calculation of an exponential average. Such an average decreases the weight of previous measurements results, as shown in the equation in FIG. 32. The higher the value of M is, the higher the weight of the older measurements is—and, consequently, the level of "forgetting" older measurements is lower.

For a complete assessment, it is advantageous to store in a computer memory all source calculations, without calculating averages, and visualization in flight of the values averaged linearly and exponentially.

The values averaged linearly show what is the average value from the start of the measurement, up to the present moment. They present a possible increase or decrease in damping with a significant delay.

Therefore, in flutter tests the exponential average is preferred because it quickly presents the possible decrease in damping, which should be a warning for the airplane crew.

The same concerns the rules of registration and visualization of the natural (structural) frequencies or harmonic vibrations, which are excited for example by propellers.

If natural vibrations of an airplane structure are tested in flight, then the measurements should be made with a constant velocity and altitude.

The increase in flight velocity during measurements is usually related to increase in the level of vibrations, which can lower the actual damping coefficients. On the other hand, the measurement of vibrations during constant decrease in flight velocity may lead to a decrease in actual values of damping coefficients.

In practice, the test flights are made for several different altitudes and with gradually increasing, predetermined flight velocities, to cover the whole range of altitudes and flight velocities envisaged for the airplane under test, with a certain overhead for ensuring safety during normal operation.

Speeding Up the Calculations with the Aid of the Fourier Transform

During in-flight tests of an airplane, the following need to be calculated based on data from several dozens of vibrations sensors: vibrations amplitudes, damping coefficients of relevant modes of vibrations, phase shifts between individual points on the airplane. Moreover, the modes of vibrations relevant for flutter should be visualized. The relevancy of the calculated parameters should be assessed and certain tasks should be executed, such as data acquisition, calculations and analyses. These calculations require thousands of Fourier transformations, for example per second, if such a delay is allowable for calculations performed in real time.

During flutter tests, the modal modes of vibrations should not be presented. The modes of flutter vibrations are usually modes comprising two or three modal modes of vibrations, for example bending-torsional forms of vibrations or torsional vibrations of tail-plane connected with bending of the rear part of the fuselage and with a phase shifted movement of the elevator of the same frequency.

Therefore, it is more important to track the so-called operational modes of vibrations, i.e. the visualization of modes of vibrations at such points of the vibrations spectrum where the amplitudes are maximal. It can be then seen whether these are dangerous vibrations of a flutter character or only vibrations strongly excited by air turbulence, for example bending forms of vibrations of wings.

An adequate speed of calculations may be achieved by calculating a Fast Fourier Transform. For example, the self-correlation function $R_{yy}(k)$ to realize the stochastic process $y(n)$ may be calculated using the equation (20) shown in FIG. 33.

In this example, the reverse transform is calculated for a product of $Y(j)$ transform and the conjugated transform $YP^*(j)$ calculated for a half-pulse signal $yp(n)$.

The calculation of the autocorrelation function using this method is, for N=1024, two times faster and, for N=2048—four times faster.

Increasing the Resolution of Calculations

FIG. 34 shows a frequently used equation for calculating a discrete Fourier transform. If the sampled segment of a vibrations signal is denoted as T=N·Δt, wherein Δt is the sampling period of the signal y(t), then the resolution of the resulting discrete spectrum in Hz is Δf=1/T. In order to achieve high resolution, i.e. low Δf values, long vibrations segments are necessary. However, long vibrations segments delay obtaining the analysis results.

In order to increase the resolution of the spectrum of vibrations, the samples of a signal may be subject to zero padding. The high frequencies range depends on signal sampling frequency and will not thus be changed.

If the modified transform will be used only to search the local spectrum maxima (resonance peaks), then zero padding may be increased. Zero padding has been verified in practice for N samples with N, 3N, 7N and 15N zeros. Such zero padding meets the requirement for $N_{sum}=2^i$, where $N=2^i$ and I=1, 2, 3, ....

By means of this method, after acquisition of the samples of the analyzed signal during 1 s, calculations of a transform on a modified signal of the length of 16 s may be performed to receive almost instantly a result of resolution Δf=0.0625 Hz instead of Δf=1 Hz. However, it must be noted that a correct result of the analysis will be obtained from frequency f=1 Hz, when N signal samples are within a single vibrations period, as it is in the FFT calculation method.

If in the above example it is desirable to obtain vibrations spectrum from 1 Hz to 50 Hz, then the evaluated signal may be sampled with a frequency $f_{pr}$=128 samples/s. In this example N=128, $N_{sum}$=2048.

The spectrum range from 1 Hz to 50 Hz is sufficient for flutter tests in flight for a majority of airplanes and gliders (for gliders and large passenger airplanes: from 2 Hz to 10 Hz, for training airplanes: from 5 Hz to 50 Hz, for military airplanes: from 10 Hz to 60 Hz).

Speeding Up Calculation of Fast Fourier Transform

In the present invention, a standard method for calculating a Fast Fourier Transform has been modified to speed up the time of computation of vibrations present in an airplane i.e. vibrations having a frequency from several to several dozen Hz. The modified algorithm for calculating a Fast Fourier Transform is presented in FIG. 35.

During in-flight flutter measurements, there is frequently a need to calculate a Fourier transform only at certain points of the vibrations spectrum.

The new algorithm according to the invention is based on the known algorithm of Murphy McCauley VBFFT (1999).

The main change introduced is that at the first run of the analysis during flight, a table of values of sine and cosine functions is calculated and these values are stored as sn(mb) and cs(mb). During calculations of transform, the modified algorithm fetches the prepared values from the table in the steps defined by lines 13 and 14.

Visualization of Vibrations

FIG. 36 presents an exemplary visualization of operational modes of vibrations obtained by the method according to the present invention. The visualization depicts a reference placement 101 of airplane structure elements with sensors 102, marked with a solid line, and the actual, in-flight placement of sensors 112 and deviations 111 of airplane structure elements resulting from the actual placement, marked with a dashed line. The visualization may be presented in color so that the actual placements are marked with a green line when excessive vibrations are not detected and with a red line when threshold values are exceeded. This allows immediate evaluation of the behavior of airplane structure elements in flight. In the presented visualization there is visible a torsion of the fuselage end as a result of improper balance of the rudder—a movement of the rudder delayed in phase with respect to the horizontal tailplane has a character of flutter vibrations with constrained amplitude. In addition to such a visualization, for each sensor there may be presented: vibrations frequency, vibrations amplitude and vibrations speed amplitude. Further, the amplitudes may be presented in comparison to the amplitude at a reference point.

In order to obtain such visualization in flight, in real time, i.e. in time less than one second from measurement, it is necessary to utilize the new method of vibrations analysis. The method according to the present invention is based on non-linear regression analysis relying on the method of least squares of time signals errors.

In the case of analysis of vibrations signals during normal flight, without exciting increased vibrations with a use of additional devices, the self-correlation function is calculated with the method formulated for non-stationary signals with a finite length, which does not change values of damping coefficients of the measured signals.

System for Carrying Out the Method According to the Present Invention

The method according to the present invention may be carried out by means of a computer system shown in FIG. 37. The system comprises signal processing circuits 201 for processing signals from vibrations sensors 202 located on an airplane structure. The signal processing circuits utilize, during operation, memory 203 for storing measurements and cache memory 204 for storing cached variables, for example the values of sine and cosine functions to improve the speed of calculating Fast Fourier Transform according to the algorithm of FIG. 35. The signal processing circuits 201 may be dedicated integrated circuits, optimized for performing certain calculations. The signal processing circuits 201 may also be implemented in a typical PC-type computer with the software for carrying out the methods disclosed above. The system is operated by a control interface 205, via which the current operation of the system may be configured. The analysis results may be presented on a monitor 206 and stored in a results memory 207. The complete system may be installed on board of an airplane. The system may also be installed partly on board of an airplane and partly on the ground, wherein signals exchanged between the on-board and ground elements of the system may be exchanged wirelessly by means of a link of a sufficient bandwidth.

The invention claimed is:

1. A measurement system for in-flight assessment of freedom from flutter of an airplane, the system comprising:
a plurality of vibration sensors located on a wing of the airplane, with two vibration sensors per selected wing chord, the vibration sensors for measuring finite duration non-stationary flutter vibrations signals; and
signal processing circuits for processing the finite duration non-stationary flutter vibrations signals from the plurality of vibration sensors, the signal processing circuits configured to:
analyze airplane structure vibrations based on the finite duration non-stationary flutter vibrations signals measured by the vibration sensors;
perform computations of the airplane structure vibrations in real-time based on current measurements from the vibration sensors;
determine, for a plurality of mode shapes of each of the finite duration non-stationary flutter vibrations signals, a natural frequency (f), a damping coefficient ($\zeta$), a phase ($\phi$) and an amplitude (A) for each mode shape by using a method of least squares of errors of time signals based on measurements from the vibration sensors;
determine a significance of the determined mock shapes of each of the finite duration non-stationary flutter vibrations signals by subtracting from the finite duration non-stationary flutter vibrations signal the determined mode shapes, and calculating a value of decrease in a residual sum of squares; and
evaluate the airplane structure vibrations by analyzing estimates of an autocorrelation function $R_{yy}(l)$ for operational finite duration non-stationary flutter vibrations signals, by computing the autocorrelation function $R_{yy}(l)$ by multiplying a constant number of samples of the finite duration non-stationary flutter vibrations signal ($y_n$) by successive segments of the finite duration non-stationary flutter vibrations signal ($y_n$), the finite duration non-stationary flutter vibrations signal having a size of N samples, and by summing results according to an equation:

$$R_{yy}(l) = \frac{1}{N/2} \sum_{n=1}^{N/2} y_n \cdot y_{n+l}$$

$$n = 1, 2, 3, \ldots, N$$

$$l = 0, 1, 2, \ldots, N/2$$

to obtain the autocorrelation function $R_{yy}(l)$ having a length of a half of the evaluated segment of the finite duration non-stationary flutter vibrations signal ($y_n$) while maintaining the values of the damping coefficients ($\zeta$) of the finite duration non-stationary flutter vibrations signals.

2. The system of claim 1, wherein the signal processing circuits are further configured to:
calculate the autocorrelation function $R_{yy}(l)$ using an inverse Fast Fourier Transform of a product $Y_{YPP}(j)$ of:
a Fast Fourier Transform $Y(j)$ of a signal $y(n)$; and
a complex conjugate $YP^*(j)$ of a Fast Fourier Transform of a half pulse signal $yp(n)$ of the signal $y(n)$, according to the equation:

$$R_{yy}(k) = \frac{1}{N/2} FFT^{-1}[Y_{YYP}(j)] \text{ for } k = 0, 1, 2, 3, \ldots, N/2 - 1$$

$$Y_{YYP}(j) = Y(j)YP^*(j)$$

$$j = 1, 2, 3, \ldots, N$$

$$Y(j) = FFT[y(n)]$$

$$YP(j) = FFT[yp(n)]$$

$$yp(n) = y(n) \text{ for } n = 1, 2, 3, \ldots, N/2$$

$$yp(n) = 0 \text{ for } n = N/2 + 1, \ldots, N$$

wherein $n=1, 2, 3 \ldots, N=2^i$, Wherein i is a natural number.

3. The system of claim 2, wherein the signal processing circuits are further configured to:
zero-pad a sampled segment of the finite duration non-stationary flutter vibrations signal having the length of N samples to obtain an output sequence having a length of $N_{sum}=2^i$, wherein i is a natural number and calculating the Fast Fourier Transform for the output sequence.

4. The system of claim 2, wherein the signal processing circuits are further configured to:
calculate the Fast Fourier Transform by using tables of values of sine and cosine functions for angles dependent on the number of samples and on the sampling frequency.

5. The system of claim 1, wherein the signal processing circuits are further configured to:
generate an image, for display on a display device functionally associated with the signal processing circuits, to visualize the airplane structure vibrations measured by the vibration sensors, the image comprising an image of the airplane structure and deviations of the airplane structure resulting from the airplane structure vibrations; and
mark the deviations having parameters above threshold values with a color different than a color of the deviations having parameters below threshold values.

6. The system of claim 5, wherein the airplane structure vibrations are visualized by the signal processing circuits calculating a phase shift or a movement phase at specified points in time.

* * * * *

UNITED STATES PATENT AND TRADEMARK OFFICE
CERTIFICATE OF CORRECTION

| | |
|---|---|
| PATENT NO. | : 9,183,180 B2 |
| APPLICATION NO. | : 13/716150 |
| DATED | : November 10, 2015 |
| INVENTOR(S) | : Niepokólczycki et al. |

Page 1 of 1

It is certified that error appears in the above-identified patent and that said Letters Patent is hereby corrected as shown below:

In the claims:

Column 16 Claim 1 line 36
Change
-- mock --
to
"mode"

Signed and Sealed this
First Day of March, 2016

Michelle K. Lee
*Director of the United States Patent and Trademark Office*